US012279093B2

(12) United States Patent
Kim et al.

(10) Patent No.: US 12,279,093 B2
(45) Date of Patent: Apr. 15, 2025

(54) HEARING DEVICE CHARGERS AND HEARING DEVICES FOR USE WITH SAME

(71) Applicant: Sonova AG, Stäfa (CH)

(72) Inventors: Jaewoo Kim, Waterloo (CA); Sahba Aazami, Founex (CH); Mika Ilvonen, Guelph (CA)

(73) Assignee: Sonova AG, Staefa (CH)

( * ) Notice: Subject to any disclaimer, the term of this patent is extended or adjusted under 35 U.S.C. 154(b) by 266 days.

(21) Appl. No.: 18/187,032

(22) Filed: Mar. 21, 2023

(65) Prior Publication Data

US 2024/0323622 A1 Sep. 26, 2024

(51) Int. Cl.
*H04R 25/00* (2006.01)

(52) U.S. Cl.
CPC ........... *H04R 25/556* (2013.01); *H04R 25/60* (2013.01); *H04R 2225/025* (2013.01); *H04R 2225/31* (2013.01)

(58) Field of Classification Search
CPC .... H04R 25/55; H04R 25/554; H04R 25/556; H04R 2225/025; H04R 2225/49; H04R 2225/51
See application file for complete search history.

(56) References Cited

U.S. PATENT DOCUMENTS 8,169,185 B2 5/2012 Partovi et al.
8,629,654 B2 1/2014 Partovi et al.
9,967,644 B2 1/2018 Chawan et al.
10,212,506 B2 2/2019 Panecki et al.
11,595,767 B1 2/2023 Rufenacht et al.
2007/0104343 A1* 5/2007 Bengtsson ........... H04R 25/305 381/322
2008/0118093 A1 5/2008 Klemenz et al.
2008/0136369 A1 6/2008 Klemenz et al.
2018/0332408 A1 11/2018 Frei et al.
2019/0173301 A1 6/2019 Narayanasamy et al.
2019/0348863 A1 11/2019 De Masi et al.
2020/0260176 A1 8/2020 Baltensperger et al.
(Continued)

FOREIGN PATENT DOCUMENTS

EP 3518560 B1 11/2020
WO WO 2015105648 A1 7/2015
WO WO 2021220077 A1 11/2021

OTHER PUBLICATIONS

U.S. Appl. No. 18/187,021, filed Mar. 21, 2023, 20240322578A1.
(Continued)

*Primary Examiner* — Kile O Blair
(74) *Attorney, Agent, or Firm* — Henricks Slavin LLP

(57) ABSTRACT

A hearing system having a hearing device, including a receiver antenna assembly with a receiver core having a relatively high magnetic permeability and a receiver coil wound around the receiver core, operably connected to a rechargeable power source, and a hearing device charger, including a transmitter antenna assembly, with a transmitter core having a relatively high magnetic permeability and a transmitter coil wound around the transmitter core, operably connected to a power supply. The respective configurations of the hearing device and the hearing device charger may be such that when the hearing device is in a charging position on the hearing device charger, the receiver core and the transmitter core together provides a closed loop path for magnetic flux.

18 Claims, 3 Drawing Sheets

(56) References Cited

U.S. PATENT DOCUMENTS

| | | | |
|---|---|---|---|
| 2021/0168536 | A1 | 6/2021 | Nielsen et al. |
| 2021/0385591 | A1 | 12/2021 | Nielsen et al. |
| 2022/0225004 | A1 | 7/2022 | Pedersen |
| 2024/0322578 | A1 | 9/2024 | Ilvonen et al. |
| 2024/0322615 | A1 | 9/2024 | Kim et al. |

OTHER PUBLICATIONS

U.S. Appl. No. 18/187,032, filed Mar. 21, 2023, 20240323622A1.
U.S. Appl. No. 18/187,043, filed Mar. 21, 2023, 20240322615A1.
U.S. Appl. No. 18/187,021, filed Mar. 21, 2023.
U.S. Appl. No. 18/187,032, filed Mar. 21, 2023.
U.S. Appl. No. 18/187,043, filed Mar. 21, 2023.

* cited by examiner

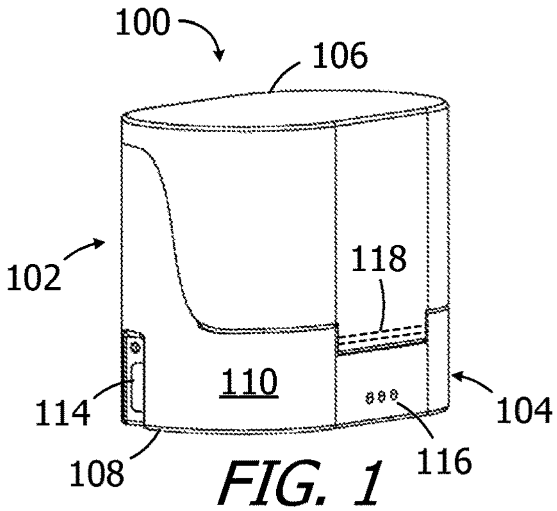
FIG. 1
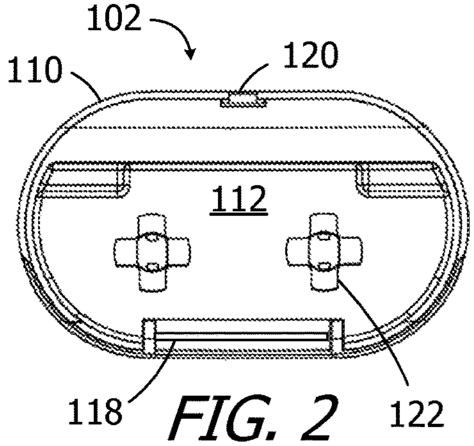
FIG. 2
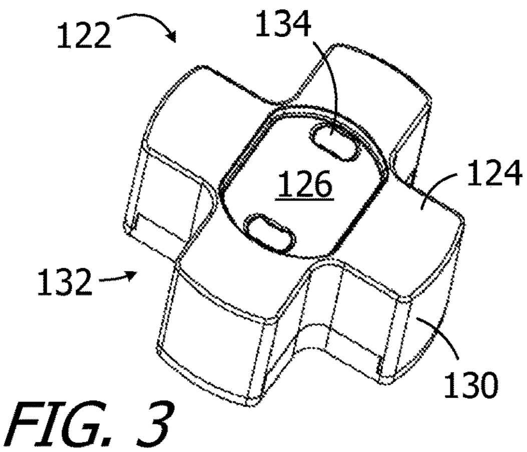
FIG. 3
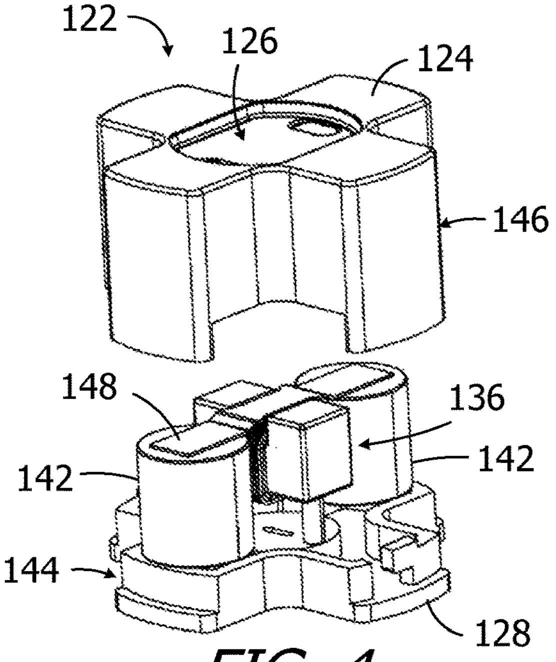
FIG. 4
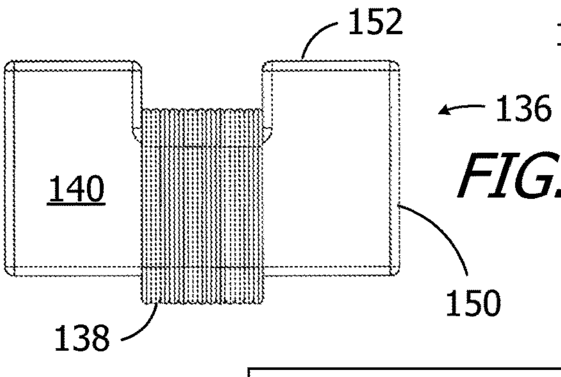
FIG. 5
FIG. 6
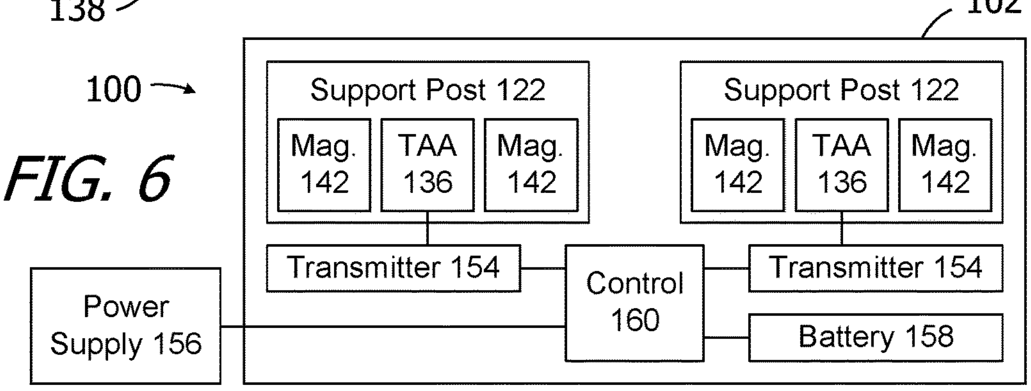

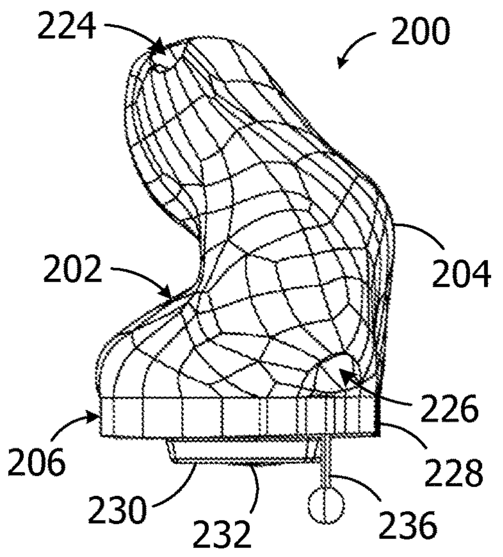
FIG. 7
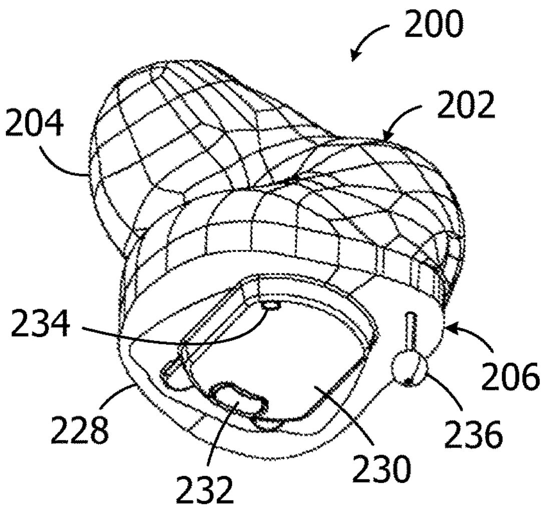
FIG. 8
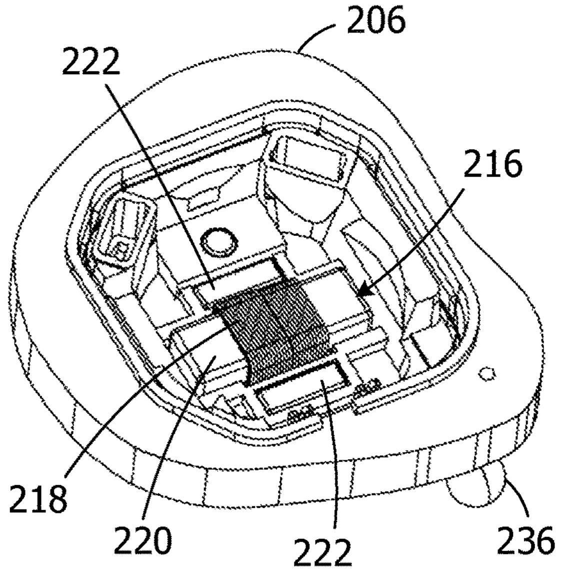
FIG. 9
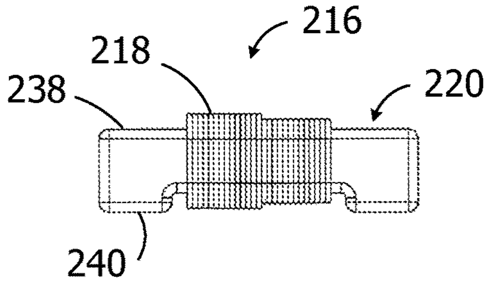
FIG. 10
FIG. 11
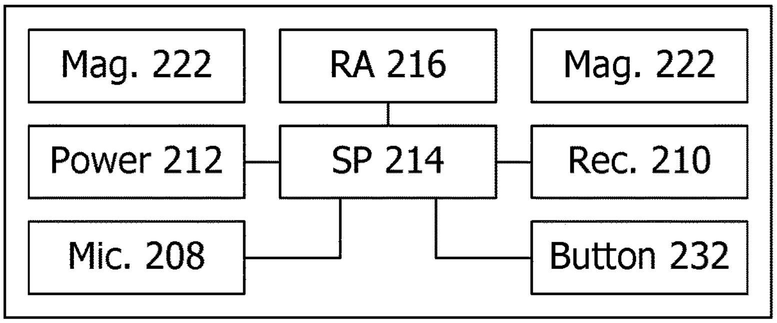

HEARING DEVICE CHARGERS AND HEARING DEVICES FOR USE WITH SAME

BACKGROUND

1. Field

The present disclosure relates generally to the charging of hearing devices.

2. Description of the Related Art

In-the-ear hearing devices, in-the-canal hearing devices and completely-in-the-canal hear devices (collectively referred to herein as "ITE hearing devices") may include a housing that has a main portion with a sound output port that is positioned facing to the tympanic membrane and a faceplate at the lateral end of the main portion. Hearing device components, such as a microphone, a receiver, electronics and a rechargeable battery (e.g., a rechargeable lithium-ion battery) may be located with the housing main portion and/or faceplate. Ambient sound pressure waves are picked up by the microphone and converted into electrical signals. The electrical signals, in turn, are processed by sound processor circuitry. The processed signals drive the receiver, which delivers amplified (or otherwise processed) sound pressure waves to the ear canal.

The ITE hearing device battery may in some instances be wirelessly charged with a battery charger. Here, the ITE hearing device includes a charging receiver coil and the battery charger includes a charging transmitter coil. The charging transmitter coil, which transfers power to the charging receiving coil, may be carried within a charging post on which the ITE hearing device is mounted during charging, and the charging post and ITE hearing device may be configured in such a manner that an optimal coil alignment is maintained. The charging post and ITE hearing device may also include magnets that secure the ITE hearing device to the charging post. Exemplary chargers are illustrated and described in PCT Pub. No. 2021/220077A1 and US Pat. Pub. No. 2022/0225004A1.

The present inventors have determined that the battery chargers associated with ITE hearing devices are susceptible to improvement. For example, the present inventors have determined that it would be desirable to increase the efficiency of the power transfer from the transmitter coil to the receiver coil. The present inventors have also determined that the magnets used to secure the ITE hearing device to a charger can become demagnetized over time due to their exposure to the strong magnetic fields associated with wireless charging and, accordingly, that it would be desirable to reduce or eliminate exposure of the magnets to the strong magnetic fields.

SUMMARY

A hearing system in accordance with at least one of the present inventions comprises a hearing device and a hearing device charger. The hearing device may include a microphone, a receiver operably connected to the microphone, a rechargeable power source, and a receiver antenna assembly, with a receiver core having a relatively high magnetic permeability and a receiver coil wound around the receiver core, operably connected to the rechargeable power source. The hearing device charger may include a power supply and a transmitter antenna assembly, with a transmitter core having a relatively high magnetic permeability and a transmitter coil wound around the transmitter core, operably connected to the power supply. The respective configurations of the hearing device and the hearing device charger may be such that when the hearing device is in a charging position on the hearing device charger, the receiver core and the transmitter core together provide a closed loop path for magnetic flux.

A hearing system in accordance with at least one of the present inventions comprises a hearing device and a hearing device charger. The hearing device may include a microphone, a receiver operably connected to the microphone, a rechargeable power source, a receiver coil operably connected to the rechargeable power source, and a hearing device magnet adjacent to the receiver coil. The hearing device charger may include a power supply, a transmitter coil operably connected to the power supply, and a charger magnet adjacent to the transmitter coil. The hearing system may further include means for preventing demagnetization of the hearing device magnet and the charger magnet by providing a magnetic flux path from the transmitter coil to the receiver coil and from the receiver coil to the transmitter coil.

There are a variety of advantages associated with such chargers and systems. By way of example, but not limitation, the transmitter and receiver cores provide a magnetic flux path that increase the efficiency of the power transfer from the transmitter coil to the receiver coil, as compared to hearing systems where the charger and hearing device lack such cores. The magnetic flux path also prevents demagnetizing of positioning magnets that are close to the coils because the magnetic flux path reduces their exposure to the strong magnetic fields associated with charging.

The above described and many other features of the present inventions will become apparent as the inventions become better understood by reference to the following detailed description when considered in conjunction with the accompanying drawings.

BRIEF DESCRIPTION OF THE DRAWINGS

Detailed descriptions of the exemplary embodiments will be made with reference to the accompanying drawings.

FIG. 1 is a perspective view of a hearing device charger in accordance with one embodiment of a present invention.

FIG. 2 is a top view of a portion of the hearing device charger illustrated in FIG. 1.

FIG. 3 is a perspective view of a portion of the hearing device charger illustrated in FIG. 1.

FIG. 4 is an exploded perspective view of a portion of the hearing device charger illustrated in FIG. 1.

FIG. 5 is a side view of a portion of the hearing device charger illustrated in FIG. 1.

FIG. 6 is a functional block diagram of the hearing device charger illustrated in FIG. 1.

FIG. 7 is a side view of a hearing device in accordance with one embodiment of a present invention.

FIG. 8 is a perspective view of the hearing device illustrated in FIG. 7.

FIG. 9 is a perspective view of a portion of the hearing device illustrated in FIG. 7.

FIG. 10 is a side view of a portion of the hearing device illustrated in FIG. 7.

FIG. 11 is a functional block diagram of the hearing device illustrated in FIG. 7.

DETAILED DESCRIPTION OF THE EXEMPLARY EMBODIMENTS

Figure 12:
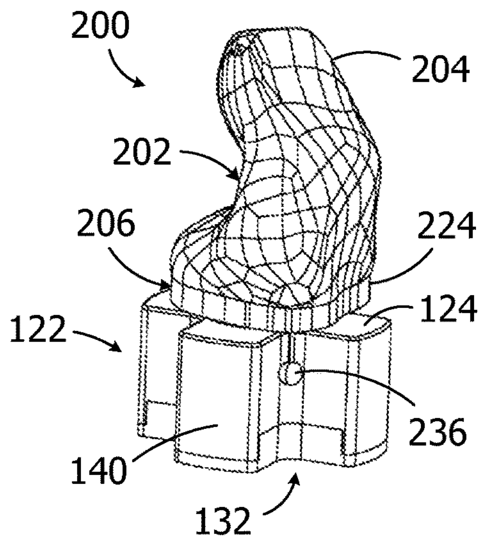
FIG. 12 is a perspective view of a hearing system including the hearing device illustrated in FIG. 7 and a portion of the hearing device charger illustrated in FIG. 1 in an engaged state with the hearing device in a charging position.

The following is a detailed description of the best presently known modes of carrying out the inventions. This description is not to be taken in a limiting sense, but is made merely for the purpose of illustrating the general principles of the inventions. The present inventions also have application in a wide variety of hearing devices that provide sound (i.e., either sound or a perception of sound) to the hearing impaired as well as others who require such hearing devices on a situational basis. Examples of such hearing devices include hearing aids, such as the ITE hearing aids described herein. The present inventions are not, however, limited to ITE hearing aids, and may be employed in combination with other hearing devices that currently exist, or are yet to be developed.

It should also be noted that if and when used herein, the term "lateral" refers to the direction and parts of hearing devices which during use face away from the tympanic membrane, the term "medial" refers to the direction and parts of hearing devices which during use face toward the tympanic membrane, the term "superior" refers to the direction and parts of hearing devices which during use face the top of the head, the term "inferior" refers to the direction and parts of hearing devices which during use face the feet, the term "anterior" refers to the direction and parts of hearing devices which during use face the front of the body, and the "posterior" refers to the direction and parts of hearing devices which during use face the rear of the body.

Referring to FIGS. 1-3, the exemplary hearing device charger (or "charger") 100 includes a base 102, with a housing 104 in which various components are located and on which various components are supported, and a cover 106 that may be pivotably mounted to the base 102. The exemplary housing 104 has a bottom wall 108, a perimeter wall 110, and an interior wall 112. A power port 114 extends through the perimeter wall 110 and a visible indicator 116, such as the illustrated set of LEDs, is associated with the perimeter wall. The cover 106, which is shown in a closed state in FIG. 1 and is omitted from FIGS. 2 and 3, may be pivotably secured to the base 102 with a hinge pin 118 and may be maintained in a closed state with a latch 120 on the housing perimeter wall 110 and an indentation (not shown) on the cover 106. Suitable materials for the base 102 and cover 106 include, but are not limited to, polycarbonate/acrylonitrile butadiene styrene (PC/ABS) such as Sabic CYCOLY C1200HF or ABS such as Chimei POLYLAC PA757F.

The exemplary charger 100 may also include a support post on which a hearing device is mounted during recharging. The support post may, in some instances, be configured to accommodate a hearing device with a laterally extending removal handle, such as the exemplary hearing device 200 described below with reference to FIGS. 7-11. To that end, the exemplary charger 100 includes a pair of hearing device support posts 122 that are configured to accommodate hearing device handle 236 (FIGS. 7-8) of the hearing device 200 as well as other handles of other hearing devices. The support posts 122, which may be mounted on, or may extend through, the interior wall 112, include a top wall 124 with a top wall recess (or "recess") 126, a bottom wall 128, and a side wall 130 that extends away from the top wall to the bottom wall. The side wall 130 extends around the top and bottom walls 124 and 128 and defines an outer perimeter and a plurality of recesses 132 (e.g., four) that extend inwardly from the outer perimeter and are configured to accommodate a hearing device handle. The outer recesses 132 may extend the entire length of the support posts 122 (as shown) or from the top wall 124 to a point between the top wall and the bottom wall 128.

The exemplary top wall recess 126 is configured, i.e., is sized and shaped, to receive a hearing device faceplate projection, such as the faceplate projection 230 (FIGS. 7-8). In the illustrated implementation, the recess 126 and faceplate projection 230 are mechanically keyed so that there are two possible orientations of the faceplate projection relative to the recess and, therefore, two possible orientations of the hearing device 200 relative to the associated support post 122. The orientations are offset by 180 degrees. By way of example, by not limitation, the recess 126 and faceplate projection 230 are generally rectangular in shape with curved longitudinal ends and straight sides. The recess 126 may also be configured to accommodate the button 232 on the hearing device faceplate projection 230 and, for example, may include a pair of button recesses 134 that are located and configured, i.e., are sized and shaped, such that the button 232 will be received in one other recesses when the hearing device faceplate projection 230 is located within the recess 126.

The exemplary hearing device charger 100 is also configured to wirelessly charge hearing devices such as the hearing device 200. To that end, and referring to FIGS. 4-6, the hearing device charger 100 includes a pair of transmitter antenna assemblies 136, each with a transmitter assembly coil (or "transmitter coil") 138 and a transmitter assembly core (or "transmitter core") 140 around which the transmitter coil is wound, that are used in conjunction with receiver antenna assemblies 216 (FIGS. 9 and 10), each with a receiver assembly coil (or "receiver coil") 218 and a receiver assembly core (or "receiver core") 220, to efficiently transmit power to hearing devices 200 through inductive coupling in the manner described below with reference to FIGS. 12-15. The hearing device charger 100 also includes magnets 142 that are attracted to hearing device magnets 222 (FIGS. 9 and 10), which together secure the hearing device 200 to the charging post 122. In the illustrated implementation, there are two magnets 142 associated with each transmitter antenna assembly 136. A transmitter antenna assembly 136 and two magnets 142 are located within each of the support posts 122 in the illustrated embodiment. By way of example, the supports posts may include a base 144, on which the transmitter antenna assembly 136 and magnets 142 are supported, and a cover 146. The base 144 includes the bottom wall 128 and portions of the side wall 130, while the cover 146 includes the top wall 124 and the remaining portions of the side wall. In some embodiments, a magnetic foil strip 148 may extend over the transmitter antenna assembly 136, from one magnet 142 to the other, in order to align and strengthen the magnetic fields of the charger magnets 142 and the hearing device magnets 222, thereby increasing the magnetic holding force.

It should be noted here that, in other charger embodiments, the above-described charging post 122 may be modified. For example, the number of recesses and/or the length may be increased or decreased. Depending on the configuration of the associated hearing device, the charging post may also be eliminated and the transmitter antenna assemblies 136 and magnets 142 may be placed below the interior wall 112.

Referring more specifically to FIG. 5, the exemplary transmitter core 140 is substantially U-shaped in that it includes a main portion 150 and a pair of extensions 152 that extend from the main portion toward the support post top wall and, correspondingly, toward the intended location of the receiver antenna assembly 216 when the hearing device 200 is on the charging post 122. The main portion 150 of the substantially U-shaped core 140 may be straight with the extensions 152 perpendicular to the main portion 150 (as shown) or may be curved. As is discussed in greater detail below with reference to FIGS. 12-15, the transmitter core 140 is formed from a ferromagnetic material with relatively high magnetic permeability and provides a low reluctance magnetic route through which flux is channeled during charging operations. As used herein, magnetic material having a "relatively high magnetic permeability" is magnetic material having an initial magnetic permeability (μi) of at least 400. Suitable materials for the transmitter core 140 include, but are not limited to, ferromagnetic materials with relatively high magnetic permeability such as, for example, ferrites that include iron oxide in combination with one or more of nickel, zinc, manganese, magnesium and cobalt as well as nickel-iron alloys that are commonly referred to as mu-metal.

Turning to FIG. 6, transmitter circuits (or "charge circuits") 154 drive the antenna coils 138. Power may be provided by a power supply 156 (e.g., an external USB power supply) that may be connected to the power port 114 as well as by a rechargeable battery (or other energy storage and supply device) 158. Operation of the charger is controlled by control circuitry 160.

As illustrated for example in FIGS. 7-11, the exemplary ITE hearing device 200 includes a housing 202, with a shell 204 that defines a shape corresponding to the ear canal and a faceplate 206 mounted to the lateral end of the shell, as well as components such as a microphone 208, a receiver 210, a rechargeable battery or other rechargeable power source 212, and sound processing electronics 214 within the housing 202. A receiver antenna assembly 216, with a receiver coil 218 and a receiver core 220 around which the receiver coil is wound, receives power from one of the transmitter antenna assemblies 136 (FIGS. 4-6) through inductive coupling during charging by the charger 100, as is described below with reference to FIGS. 12-15. The receiver antenna assembly 216 is located within the faceplate 206, as are magnets 222 that are attracted to the charger magnets 142 (FIGS. 4 and 6). For example, the magnets 142 and 222 define respective N-poles and S-pole and the magnets may be oriented in such a manner that the N-poles of the magnets 142 and face the S-poles of the magnets 222. The housing shell 204 is sized and shaped for positioning within the ear canal and includes a sound output aperture 224 and a venting aperture 226. The shape of the housing shell 204 may be a generic shape that is suitable for a large number of patients or may be a custom shape that is 3D printed or otherwise formed for the ear canal of a particular patient. Suitable housing materials include, but are not limited to, plastics such as an acrylic and metals such as titanium.

Referring more specifically to FIGS. 7 and 8, the exemplary faceplate 206 includes a main portion 228 and a projection 230, with a push button 232 that may perform various functions and a sound input aperture 234, that extends laterally from the main portion. The projection 230 is configured, i.e., is sized and shaped, to be received by a support post top recess 126 (FIGS. 3 and 4) in such a manner that the receiver antenna assembly 216 will be properly aligned with the transmitter antenna assembly 136 and the magnets 222 will be properly aligned with the charger magnets 142. A handle 236, which may be used to remove the hearing device from the recipient's ear, extends laterally from the faceplate main portion 228.

As illustrated for example in FIG. 10, the exemplary receiver core 220 is substantially U-shaped in that it includes a main portion 238 and a pair of extensions 240 that extend from the main portion toward the bottom wall of the projection 230 and, correspondingly, toward the intended location of the transmitter antenna assembly 136 when the hearing device 200 is on the charging post 122. The main portion 238 of the substantially U-shaped core 220 may be straight with the extensions 240 perpendicular to the main portion 238 (as shown) or may be curved. The extensions 240 may be omitted in some implementations. As is discussed in greater detail below with reference to FIGS. 12-15, the receiver core 220 is formed from a ferromagnetic material with relatively high magnetic permeability and provides a low reluctance magnetic route through which flux is channeled during charging operations. Suitable materials for the receiver core 220 include, but are not limited to, ferromagnetic materials with relatively high magnetic permeability such as, for example, ferrites that include iron oxide in combination with one or more of nickel, zinc, manganese, magnesium and cobalt as well as nickel-iron alloys that are commonly referred to as mu-metal.

Figure 13:
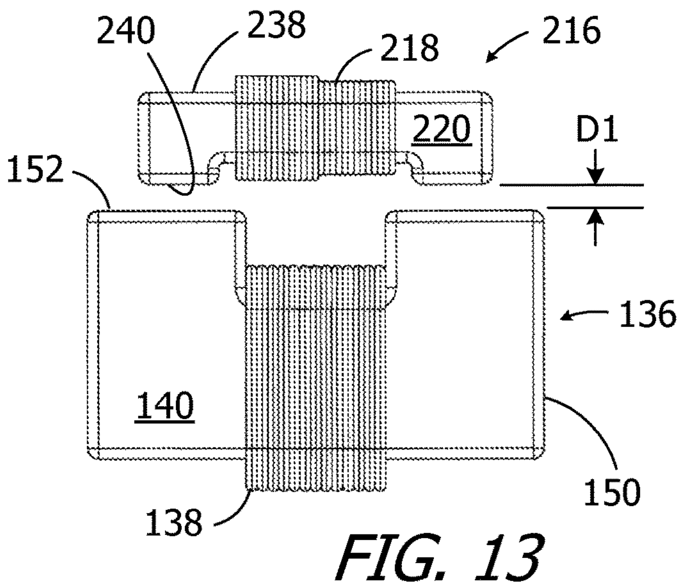
FIG. 13 is a side view of portions of the hearing device illustrated in FIG. 7 and the hearing device charger illustrated in FIG. 1 when the hearing device and charger are in the engaged state illustrated in FIG. 12.
Figure 14:
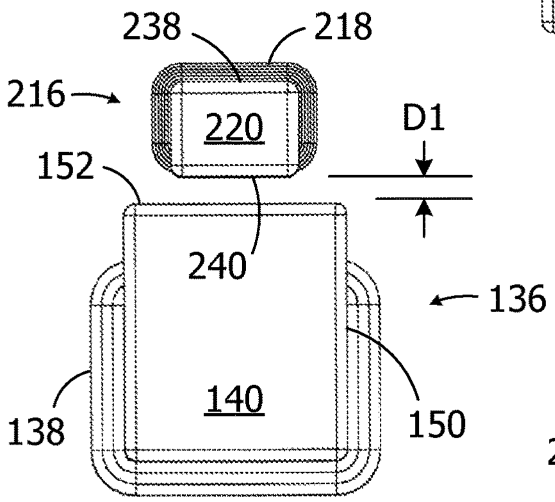
FIG. 14 is an end view of portions of the hearing device illustrated in FIG. 7 and the hearing device charger illustrated in FIG. 1 when the hearing device and charger are in the engaged state illustrated in FIG. 12.
Figure 15:
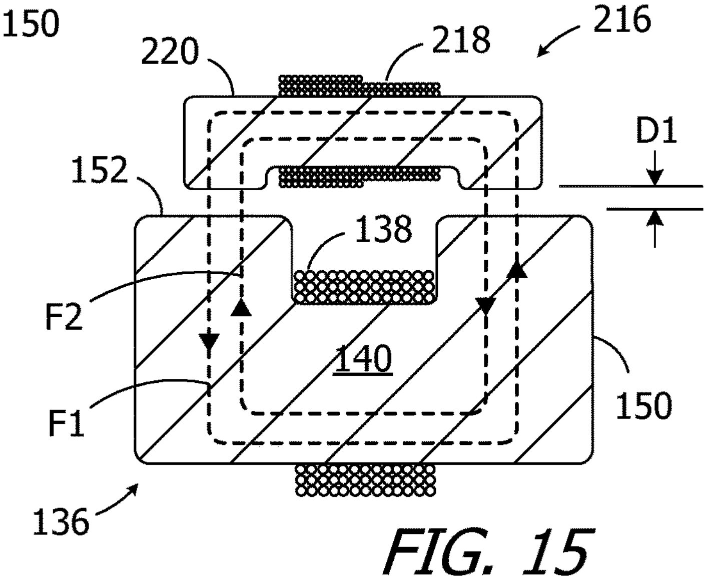
FIG. 15 is a section view of portions of the hearing device illustrated in FIG. 7 and the hearing device charger illustrated in FIG. 1 when the hearing device and charger are in the engaged state illustrated in FIG. 12 and the hearing device is being charged.

An exemplary hearing system may include the exemplary hearing device charger 100 and one or more hearing device 200. To that end, the exemplary hearing device 200 is shown in a charging position on one of the charger support posts 122 in FIG. 12. The hearing device projection 230 (FIGS. 7 and 8) is located within the support post recess 126 (FIGS. 3 and 4), the hearing device handle 236 is located within one of the support post recesses 132, and the hearing device and support post magnets 142 and 222 hold the hearing device 200 in place and maintain proper alignment of the transmitter and receiver antenna assemblies 136 and 216. In particular, one of the transmitter antenna assemblies 136 of the charger 100 is aligned with the receiver antenna assembly 216 of the hearing device 200. In the illustrated implementation, the receiver core 220 is centered relative to the transmitter assembly core 140, i.e., the receiver core and the transmitter assembly core are aligned in the superior-inferior and anterior-posterior directions (FIGS. 13 and 14). The transmitter assembly core 140 is separated from the receiver core 220 by a relatively small distance D1, as is shown in FIGS. 13 and 14. The distance D1 may range from about 0.1 mm to about 0.8 mm in some embodiments, and is about 0.45 mm in the illustrated embodiment. As used herein in the context of distance D1, "about" means±10%.

The respective configurations of the exemplary cores 140 and 220, as well as the distance D1 therebetween, results in the cores functioning together as a single ring-type core that provides a controlled closed loop path for magnetic flux in a manner similar to a transformer core. During charging, alternating current flows through the transmitter coil 138 as alternating voltage is applied to the transmitter coil. An alternating charging magnetic field (note flux lines F1 and F2) is created in the cores 140 and 220, thereby inductively coupling the receiver coil 218 to the transmitter coil 138. An alternating voltage is thereby applied to the receiver coil 218 and alternating current, which is used to charge the rechargeable power source 212, flows through the receiver coil.

There are a number of advantages associate with the use of the high magnetically permeable ferromagnetic cores 140 and 220 in the manner described above. For example, by providing the aforementioned magnetic flux path, the cores 140 and 220 increase the efficiency of the power transfer from the transmitter coil 138 to the receiver coil 218, as compared to hearing systems where the charger and hearing device lack such cores. The increased efficiency facilitates the use of smaller coils. The magnetic flux path also prevents demagnetizing of positioning magnets that are close to the coils, such as the magnets 142 and 222, because the magnetic flux path reduces their exposure to the strong magnetic fields associated with charging.

Although the inventions disclosed herein have been described in terms of the preferred embodiments above, numerous modifications and/or additions to the above-described preferred embodiments would be readily apparent to one skilled in the art. By way of example, but not limitation, the inventions include any combination of the elements from the various species and embodiments disclosed in the specification that are not already described. It is intended that the scope of the present inventions extend to all such modifications and/or additions and that the scope of the present inventions is limited solely by the claims set forth below.

We claim:

1. A hearing system, comprising:

a hearing device including
- a microphone,
- a receiver operably connected to the microphone,
- a rechargeable power source, and
- a receiver antenna assembly, with a receiver core having a relatively high magnetic permeability and a receiver coil wound around the receiver core, operably connected to the rechargeable power source; and a hearing device charger including
- a power supply, and
- a transmitter antenna assembly, with a transmitter core having a relatively high magnetic permeability and a transmitter coil wound around the transmitter core, operably connected to the power supply;

wherein the respective configurations of the hearing device and the hearing device charger are such that when the hearing device is in a charging position on the hearing device charger, the receiver core and the transmitter core together provide a closed loop path for magnetic flux.

2. A hearing system as claimed in claim 1, wherein the transmitter core is substantially U-shaped.

3. A hearing system as claimed in claim 1, wherein the receiver core is substantially U-shaped.

4. A hearing system as claimed in claim 1, wherein the receiver core and the transmitter core are formed from a ferrite and/or a mu-metal.

5. A hearing system as claimed in claim 1, wherein the hearing device includes a hearing device magnet that is adjacent to the receiver antenna assembly;

the hearing device charger includes a charger magnet that is adjacent to the transmitter antenna assembly; and the hearing device magnet and the charger magnet are attracted to one another when the hearing device is in the charging position on the hearing device charger.

6. A hearing system as claimed in claim 1, wherein the hearing device includes a pair of hearing device magnets on opposite sides of the receiver antenna assembly;

the hearing device charger includes a pair of charger magnets on opposite sides of the transmitter antenna assembly; and the hearing device magnets are attracted to the charger magnets when the hearing device is in the charging position on the hearing device charger.

7. A hearing system as claimed in claim 1, wherein the hearing device charger includes a charger housing with a recess;

the power supply and transmitter antenna assembly are located within the charger housing;

the hearing device includes a hearing device housing with a projection;

the microphone, receiver, rechargeable power source and receiver antenna assembly are located within the hearing device housing; and the hearing device housing projection is located within the charger housing recess when the hearing device is in the charging position on the hearing device charger.

8. A hearing system as claimed in claim 7, wherein the hearing device charger housing includes a hearing device support post on which the recess is located; and the transmitter antenna assembly is located within the hearing device support post.

9. A hearing system as claimed in claim 8, wherein the hearing device includes a pair of hearing device magnets on opposite sides of the receiver antenna assembly;

the hearing device charger includes a pair of charger magnets within the hearing device support post and on opposite sides of the transmitter antenna assembly; and the hearing device magnets are attracted to the charger magnets when the hearing device is in the charging position on the hearing device charger.

10. A hearing system as claimed in claim 1, wherein the hearing device support post defines a support post outer perimeter and includes a plurality of support post outer recesses that extend inwardly from the support post outer perimeter.

11. A hearing system as claimed in claim 1, wherein the receiver core is separated from the transmitter core by a distance of about 0.1 mm to about 0.8 mm when the hearing device is in the charging position on the hearing device charger.

12. A hearing system as claimed in claim 1, wherein the receiver core is centered relative to the transmitter core when the hearing device is in the charging position on the hearing device charger.

13. A hearing system as claimed in claim 1, wherein the hearing device comprises an ITE hearing device.

14. A hearing system, comprising:

a hearing device including
- a microphone,
- a receiver operably connected to the microphone,
- a rechargeable power source,
- a receiver coil operably connected to the rechargeable power source, and
- a hearing device magnet adjacent to the receiver coil; and a hearing device charger including a power supply, a transmitter coil operably connected to the power supply, and a charger magnet adjacent to the transmitter coil; and means for preventing demagnetization of the hearing device magnet and the charger magnet by providing a magnetic flux path from the transmitter coil to the receiver coil and from the receiver coil to the transmitter coil.

15. A hearing system as claimed in claim 14, wherein the hearing device includes a pair of hearing device magnets on opposite sides of the receiver coil; and the hearing device charger includes a pair of charger magnets on opposite sides of the transmitter coil.

16. A hearing system as claimed in claim 14, wherein the hearing device charger includes a charger housing with a recess;

the power supply and transmitter coil are located within the charger housing;

the hearing device includes a hearing device housing with a projection;

the microphone, receiver, rechargeable power source and receiver coil are located within the hearing device housing; and the hearing device housing projection is located within the charger housing recess when the hearing device is in the charging position on the hearing device charger.

17. A hearing system as claimed in claim 16, wherein the hearing device charger housing includes hearing device support post on which the recess is located; and the transmitter coil is located within the hearing device support post.

18. A hearing system as claimed in claim 14, wherein the hearing device comprises an ITE hearing device.

* * * * *